United States Patent
Li et al.

(10) Patent No.: US 11,901,561 B2
(45) Date of Patent: Feb. 13, 2024

(54) POSITIVE ELECTRODE SHEET AND SECONDARY BATTERY INCLUDING THE SAME, BATTERY MODULE, BATTERY PACK, AND ELECTRICAL APPARATUS

(71) Applicant: CONTEMPORARY AMPEREX TECHNOLOGY CO., LIMITED, Ningde (CN)

(72) Inventors: Quanguo Li, Ningde (CN); Yonghuang Ye, Ningde (CN); Songjun Shi, Ningde (CN); Qian Liu, Ningde (CN); Jun Peng, Ningde (CN); Fajun Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/069,067

(22) Filed: Dec. 20, 2022

(65) Prior Publication Data
US 2023/0170491 A1    Jun. 1, 2023

Related U.S. Application Data

(63) Continuation of application No. PCT/CN2021/134825, filed on Dec. 1, 2021.

(51) Int. Cl.
*H01M 4/62*  (2006.01)
*H01M 4/525*  (2010.01)
(Continued)

(52) U.S. Cl.
CPC ........... *H01M 4/628* (2013.01); *H01M 4/505* (2013.01); *H01M 4/525* (2013.01); *H01M 4/623* (2013.01);
(Continued)

(58) Field of Classification Search
CPC ........... H01M 10/052; H01M 10/0525; H01M 2004/021; H01M 2004/028;
(Continued)

(56) References Cited

U.S. PATENT DOCUMENTS

| | | |
|---|---|---|
| 2013/0209865 A1 | 8/2013 | Kim et al. |
| 2020/0144600 A1 | 5/2020 | Zhong et al. |
| 2020/0161638 A1* | 5/2020 | Zhao ................... H01M 10/052 |

FOREIGN PATENT DOCUMENTS

| | | |
|---|---|---|
| CN | 103117374 B | 2/2016 |
| CN | 106941169 A | 7/2017 |

(Continued)

OTHER PUBLICATIONS

The World Intellectual Property Organization (WIPO) International Search Report for PCT/CN2021/134825 dated Aug. 30, 2022 6 pages (with translation).

(Continued)

*Primary Examiner* — Victoria H Lynch
(74) *Attorney, Agent, or Firm* — ANOVA LAW GROUP, PLLC

(57) ABSTRACT

A positive electrode sheet includes a current collector including a coating region and a non-coating region, a resistance layer disposed on the current collector and including a conductive agent, a first binder, and a first positive electrode active material, and a positive electrode active material layer including a second positive electrode active material, a conductive agent, and a second binder. A resistance of the resistance layer is greater than a resistance of the positive electrode active material layer. In a cross section of the positive electrode sheet, a projection of at least a part of the positive electrode active material layer on the current collector and a projection of the resistance layer on the current collector do not overlap. A polarization parameter P (Continued)

of the positive electrode sheet is in a range of 0.4-65.0 and equals $((1-S)/S)\cdot(R1/R2)$.

20 Claims, 4 Drawing Sheets

(51) Int. Cl.
  *H01M 4/505* (2010.01)
  *H01M 4/02* (2006.01)
(52) U.S. Cl.
  CPC ...... *H01M 4/625* (2013.01); *H01M 2004/021* (2013.01); *H01M 2004/028* (2013.01)
(58) Field of Classification Search
  CPC ...... H01M 4/0404; H01M 4/13; H01M 4/131; H01M 4/136; H01M 4/1391; H01M 4/505; H01M 4/525; H01M 4/5825; H01M 4/62; H01M 4/622; H01M 4/623; H01M 4/624; H01M 4/625; H01M 4/628; H01M 4/661; H01M 4/663; H01M 4/667; H01M 4/668; Y02E 60/10
  See application file for complete search history.

(56) References Cited

FOREIGN PATENT DOCUMENTS

| | | |
|---|---|---|
| CN | 108091824 A | 5/2018 |
| CN | 110073525 A | 7/2019 |
| CN | 110611076 A | 12/2019 |
| CN | 110660960 A | 1/2020 |
| CN | 111200103 A | 5/2020 |
| CN | 107946543 B | 7/2020 |
| CN | 112086676 A | 12/2020 |
| CN | 113646932 A | 11/2021 |
| JP | 2008293875 A | 12/2008 |

OTHER PUBLICATIONS

The World Intellectual Property Organization (WIPO) Written Opinion for PCT/CN2021/134825 dated Aug. 30, 2022 7 pages (with translation).

The European Patent Office (EPO) The Extended European Search Report for 21943324.0 dated Nov. 27, 2023 6 Pages.

* cited by examiner

POSITIVE ELECTRODE SHEET AND SECONDARY BATTERY INCLUDING THE SAME, BATTERY MODULE, BATTERY PACK, AND ELECTRICAL APPARATUS

CROSS-REFERENCE TO RELATED APPLICATION

This application is a continuation of International Application No. PCT/CN2021/134825, filed on Dec. 1, 2021, the entire content of which is incorporated herein by reference.

TECHNICAL FIELD

The present application relates to the technical field of secondary batteries, and in particular to a positive electrode sheet applicable to a secondary battery, as well as a secondary battery including the same, a battery module, a battery pack, and an electrical apparatus.

BACKGROUND ART

In recent years, with the vigorous promotion of new energy electric vehicles, its market share is also increasing. At present, the most widely used energy storage batteries for new energy electric vehicles are mainly lithium-ion secondary batteries. With the continuous development of lithium-ion secondary batteries and their widening applications, higher requirements have been placed on their energy density, cycle performance and safety performance.

However, at present, the cycle life of lithium-ion secondary batteries is generally 800 to 900 times of charge and discharge, and then the capacity decays to about 80% of the initial value. At present, in order to increase the service life of a battery, more effective means are: improving the surface coating of active materials, and reducing surface side reactions; and increasing the content of conductive materials, and lowering the resistance. However, the existing means all bring high costs and technical challenges. Therefore, the existing lithium-ion secondary batteries still need to be improved in terms of service life.

SUMMARY

In view of the above problems, the object of the present application is to provide a positive electrode sheet for a secondary battery and a secondary battery including the positive electrode sheet, a battery module, a battery pack and an electrical apparatus, wherein by controlling the release of lithium ions, it is realized that the capacity decay of the battery is slowed down while ensuring the power performance of the battery, thereby extending the service life.

In order to implement the above object, in one aspect, the present application provides a positive electrode sheet for a secondary battery, including a current collector, a resistance layer and a positive electrode active material layer, wherein the current collector includes a coating region and a non-coating region other than the coating region, the resistance layer includes a conductive agent, a binder and a first positive electrode active material, the positive electrode active material layer includes a second positive electrode active material, a conductive agent and a binder, a resistance of the resistance layer is greater than a resistance of the positive electrode active material layer, and the resistance layer is provided on the current collector. In a cross section of the positive electrode sheet, a projection of at least a part of the positive electrode active material layer on the current collector (in the present application, the projection refers to an orthographic projection perpendicular to a main surface of the current collector) and a projection of the resistance layer on the current collector do not overlap, and a polarization parameter P of the positive electrode sheet is in a range of 0.4-65.0, the polarization parameter $P=((1-S)/S)\cdot(R1/R2)$, wherein S is an area ratio of the resistance layer relative to the coating region of the current collector, R1 is a film resistance value of the positive electrode sheet in a part where the resistance layer is provided, and R2 is a film resistance value of the positive electrode sheet in a part of the coating region where the resistance layer is not provided.

In some embodiments, P is in some embodiments in a range of 0.5-36.0, in some embodiments in a range of 1.5-8.0.

In some embodiments, S is in some embodiments in a range of 0.15-0.85, in some embodiments in a range of 0.20-0.80, in some embodiments in a range of 0.40-0.60.

In some embodiments, a projection of a part of the positive electrode active material layer on the current collector overlaps the projection of the resistance layer on the current collector.

In some embodiments, the projection of the positive electrode active material layer on the current collector and the projection of the resistance layer on the current collector do not overlap at all.

In some embodiments, in the resistance layer, the mass content of the binder is 10.0-85.0 wt % based on the total weight of the resistance layer; optionally, the mass content of the first positive electrode active material is 10.0-70.0 wt % based on the total weight of the resistance layer; and optionally, the mass content of the conductive agent is 5.0-20.0 wt % based on the total weight of the resistance layer.

In some embodiments, R1/R2 is in a range of 1.15-26.00; in some embodiments, R1 is in a range of 0.3-8.0Ω; and/or in some embodiments, R2 is in a range of 0.3-4.0Ω.

In some embodiments, the first positive electrode active material and the second positive electrode active material each include one or more selected from lithium cobalt oxide, lithium manganate, lithium nickel cobalt manganese oxide, lithium nickel cobalt aluminium oxide, lithium iron phosphate, and lithium manganese nickel oxide; the conductive agent includes one or more selected from graphite, carbon black, acetylene black, graphene and carbon nanotubes; and the binder includes one or more selected from polyvinylidene fluoride, polyacrylic acid, polytetrafluoroethylene and polyimide.

In other embodiments, the first positive electrode active material and the second positive electrode active material each include one or more selected from layered transition metal oxide, polyanionic compound, Prussian blue compound, sulfide, nitride, carbide and titanate; the conductive agent includes one or more selected from graphite, carbon black, acetylene black, graphene and carbon nanotubes; and the binder includes one or more selected from polyvinylidene fluoride, polyacrylic acid, polytetrafluoroethylene and polyimide.

In some embodiments, a compaction density of the positive electrode sheet is 2.0-4.0 g/cm$^3$, in some embodiments 2.3-4.0 g/cm$^3$.

In some embodiments, a thickness of the current collector is 8-14 μm, in some embodiments 10-13 μm; a thickness of the positive electrode sheet is 100-200 μm; and/or a thickness of the resistance layer is 1-30 μm, in some embodiments 10-13 μm.

In some embodiments, $D_v50$ of at least one of the first positive electrode active material and the second positive electrode active material is 1-20 μm, in some embodiments 5-12 μm.

In another aspect, the present application also provides a secondary battery, including a positive electrode, a negative electrode, an electrolyte and a separator, wherein the positive electrode may include the above-mentioned positive electrode sheet for the secondary battery of the present application.

In another aspect, the present application further provides a battery module. The battery module of the present application may include the secondary battery of the present application as described above.

In another aspect, the present application further provides a battery pack. The battery pack of the present application may include the battery module of the present application as described above.

In another aspect, the present application further provides an electrical apparatus. The electrical apparatus of the present application may include the secondary battery of the present application as described above, or the battery module of the present application as described above, or the battery pack of the present application as described above, or a combination thereof.

In the secondary battery of the present application, by applying the positive electrode sheet provided with the resistance layer of the present application to the battery, the deintercalated speed of active lithium ions in partial regions of the positive electrode sheet is slowed down, so that part of lithium is retained in the regions (because during charging, compared with a conventional positive electrode active material layer, the deintercalated speed of the active lithium ions in the regions is slower, part of the lithium can be retained at the end of charging). During the subsequent cycle of the battery, with the gradual aging of the battery, the active lithium retained in the partial regions of the positive electrode sheet above is gradually released, and the battery capacity shows a trend of increasing first and then gradually decreasing, thereby increasing the service life of the battery.

DESCRIPTION OF REFERENCE NUMERALS

Figure 1:
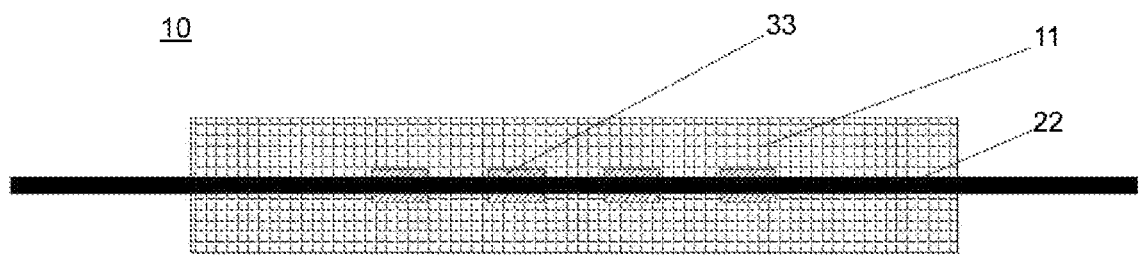
FIG. 1 is a schematic cross-sectional view of a positive electrode sheet in a thickness direction of one embodiment of the present application.

10 Positive electrode sheet
11 Positive electrode active material layer
22 Current collector
33 Resistance layer
1 Battery pack
2 Upper box
3 Lower box
4 Battery module
5 Secondary battery
51 Case
52 Electrode assembly
53 Top cover assembly

DETAILED DESCRIPTION

In order to make the objectives, technical solutions and advantages of the present application clearer, the embodiments of the present application will be described in detail below with reference to the drawings. However, it should be understood by those of ordinary skills in the art that these embodiments are only used for illustrating the technical solutions of the present application, rather than limiting them.

For the sake of brevity, the present application specifically discloses some numerical ranges. However, any lower limit can be combined with any upper limit to form a range not explicitly recited; and any lower limit can be combined with another lower limit to form a range not explicitly recited, and likewise, any upper limit can be combined with any another upper limit to form a range not explicitly recited. Further, each individually disclosed point or single value itself may serve as a lower limit or upper limit in combination with any other point or single value or with other lower limits or upper limits to form an unspecified range.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and in some embodiments sequentially. For example, the method comprises steps (a) and (b), meaning that the method may comprise steps (a) and (b) performed sequentially, or may comprise steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

Unless otherwise specified, the terms "comprise," "comprising," "include" and "including" mentioned in the present application may be open-ended. For example, the "including" and "comprising" may indicate that it is possible to include or comprise other components not listed.

Unless otherwise specified, in the present application, terms "center," "longitudinal," "transverse," "length," "width," "thickness," "upper," "lower," "front," "back,"

"left," "right," "vertical," "horizontal," "top," "bottom," "inner," "outer," "clockwise," "counterclockwise," "transverse," "longitudinal," "axial," "radial," "circumferential," etc. indicating orientation or position relationships refer to being based on the orientation or position relationships shown in the drawings and are only intended to facilitate the simplified description of the embodiments of the present application, rather than indicating or implying that the apparatus or element referred to must have a particular orientation or position relationship or be constructed and operated in a particular orientation or position relationship, and therefore are not to be interpreted as limitations on the embodiments of the present application.

In the existing technology, it is generally recognized that reducing the impedance of an electrode sheet including an active material layer and a current collector can reduce the internal resistance of a cell and help improving the cycle performance of a lithium-ion secondary battery. The kinetic performance of a battery is affected by the deintercalated speed of lithium ions of a positive electrode sheet, and the higher the deintercalated speed of the lithium ions, i.e., the higher the speed of moving of the lithium ions deintercalated from a positive electrode active material layer to a negative electrode, the better the kinetic performance.

However, the inventors of the present application have surprisingly found that by providing a resistance layer having higher resistance than the positive electrode active material layer in a predetermined manner on the current collector of the positive electrode sheet for the secondary battery, it is possible to improve the cycle performance of the secondary battery and prolong the service life of the battery instead. Specifically, the projection of the resistance layer of the present application on the current collector does not overlap the projection of at least a part of the positive electrode active material layer on the current collector. Thus, when the battery starts to be charged, the potential of the positive electrode sheet is equal everywhere, and the lithium ions are deintercalated from the positive electrode active material layer and move toward a negative electrode. In the charging process, due to the existence of the resistance layer, the positive electrode active material layer above the resistance layer (the projections overlapped) or the resistance layer itself retains a part of lithium (that is, a part of lithium is not deintercalated from the positive electrode active material and is retained), and the positive electrode active material layer not above the resistance layer (the projections not overlapped) is not affected by the above. As the lithium-ion secondary battery is charged and discharged, the lithium retained in the positive electrode active material layer above the resistance layer continuously replenishes lithium consumed by the negative electrode. In the cycle process, with the gradual elimination and aging of the battery polarization, the battery capacity presents the trend of rising first and then gradually decaying, which will eventually reduce the capacity decay of the battery as a whole and prolong the service life of the battery.

Based on the above findings, the present application provides a positive electrode sheet for a secondary battery, including: a current collector, a resistance layer, and a positive electrode active material layer, wherein
- the current collector includes a coating region and a non-coating region other than the coating region,
- the resistance layer includes a conductive agent, a binder and a first positive electrode active material,
- the positive electrode active material layer includes a second positive electrode active material, a conductive agent and a binder,
- a resistance of the resistance layer is greater than a resistance of the positive electrode active material layer, and the resistance layer is disposed on the current collector,
- in a cross section of the positive electrode sheet (in the present application, the cross section refers to a section perpendicular to a main surface of the current collector), a projection of at least a part of the positive electrode active material layer on the current collector and a projection of the resistance layer on the current collector do not overlap, and
- a polarization parameter P of the positive electrode sheet is in a range of 0.4-65.0, and the polarization parameter $P=((1-S)/S)\cdot(R1/R2)$, wherein S is an area ratio of the resistance layer relative to the coating region of the current collector, R1 is a film resistance value of the positive electrode sheet in a part where the resistance layer is provided, and R2 is a film resistance value of the positive electrode sheet in a part of the coating region where the resistance layer is not provided.

As mentioned above, in the present application, the current collector includes the coating region and optionally the non-coating region other than the coating region. In the coating region, the positive electrode active material layer and the resistance layer may be provided on the current collector. The non-coating region other than the coating region may be located at two ends or the periphery of the coating region. In the present application, the purpose of describing the non-coating region is only to illustrate that the area as a basis for the area ratio of the resistance layer is the area of a region of the current collector coated with a coating (rather than the area of the entire current collector). In other words, if the surface of the current collector is fully coated, the current collector may only include the coating region.

In the present application, in the cross section of the positive electrode sheet, the projection of at least a part of the positive electrode active material layer on the current collector and the projection of the resistance layer on the current collector do not overlap. Thus, non-overlapping positions exist between the projection of the resistance layer on the current collector and the projection of at least a part of the positive electrode active material layer on the current collector. This structural feature can play the role of imparting polarization capability to the positive electrode sheet, thereby slowing down the capacity decay of the battery and prolonging the service life of the battery. Specifically, as described above, in the charging process of the battery, the positive electrode active material layer above the resistance layer (the projections overlapped) or the resistance layer can retain a part of the lithium that is not deintercalated from the positive electrode active material due to the influence of the resistance layer, and the positive electrode active material layer not above the resistance layer (the projections not overlapped) is not affected by the above. As the lithium-ion secondary battery is charged and discharged, the lithium retained in the positive electrode active material layer above the resistance layer or the resistance layer continuously replenishes lithium consumed by the negative electrode. In the cycle process, with the gradual elimination and aging of the battery polarization, the battery capacity presents the trend of rising first and then gradually decaying, which will eventually slow down the capacity decay of the battery as a whole and prolong the service life of the battery.

In the present application, the resistance layer does not completely cover the coating region of the current collector.

In other words, the area ratio S of the resistance layer relative to the coating region of the current collector is less than 1.

By providing the resistance layer with higher resistance as described above, the positive electrode sheet of the present application will have different film resistance values in the part provided with the resistance layer and the part not provided with the resistance layer. In the present application, the film resistance value of the positive electrode sheet in the part where the resistance layer is provided is denoted as R1, the film resistance value of the positive electrode sheet in the part of the coating region of the current collector where the resistance layer is not provided is denoted as R2, and R1/R2 is greater than 1.

In the present application, both the area size and the resistance magnitude of the resistance layer provided will affect the polarizability of the positive electrode sheet. If the area of the resistance layer is not large enough, the area ratio of the resistance layer relative to the coating region of the current collector is not large enough, and it is difficult for the positive electrode sheet to retain a sufficient amount of active lithium. If the resistance of the resistance layer is not large enough, the resistance difference between the resistance layer and the positive electrode active material layer will not be large enough, so that the ratio R1/R2 between the film resistance value R1 of the positive electrode sheet in the part where the resistance layer is provided and the film resistance value R2 of the positive electrode sheet in the part of the coating region of the current collector where the resistance layer is not provided is not large enough, and thus it is difficult for the positive electrode sheet to retain an appropriate amount of active lithium. On the other hand, if the area of the resistance layer is too large, it may undesirably result in excessive retention of lithium ions in the part where the resistance layer is provided on the current collector of the positive electrode sheet. Moreover, if the area of the resistance layer is too large, or the resistance of the resistance layer is too large, it will adversely affect the power performance of the battery. Therefore, in the present application, in the setting of the resistance layer, both the area size and the resistance magnitude of the resistance layer are key considerations. Moreover, the insufficiency of either of the area size and the resistance magnitude of the resistance layer can be compensated by an appropriate increase in the other, thereby ensuring the power performance of the battery while retaining a suitable amount of active lithium for the positive electrode sheet. It can be seen that the area size and the resistance magnitude of the resistance layer support each other and have an interaction relationship, and the two work synergistically to ensure the power performance of the battery while retaining an appropriate amount of active lithium for the positive electrode sheet.

Therefore, in the present application, in order to fully reflect the influence of the area size and the resistance magnitude of the resistance layer on the polarization of the positive electrode sheet, the polarization parameter P of the positive electrode sheet is proposed. As described above, the polarization parameter $P=((1-S)/S)\cdot(R1/R2)$, wherein S is the area ratio of the resistance layer relative to the coating region of the current collector, R1 is the film resistance value of the positive electrode sheet in the part where the resistance layer is provided, and R2 is the film resistance value of the positive electrode sheet in the part of the coating region where the resistance layer is not provided. In addition, in the present application, when the film resistance value R1 of the positive electrode sheet in the part where the resistance layer is provided or the film resistance value R2 of the positive electrode sheet in the part of the coating region where the resistance layer is not provided are not uniform in regions, R1 and R2 refer to average values.

In the present application, in order to ensure the power performance of the battery while retaining an appropriate amount of active lithium in the positive electrode sheet, the polarization parameter P of the positive electrode sheet is set in the range of 0.4-65.0.

By adjusting the area ratio of the resistance layer disposed on the current collector relative to the coating region of the current collector, and/or adjusting the ratio R1/R2 of the film resistance value R1 of the positive electrode sheet in the part where the resistance layer is provided to the film resistance value R2 of the positive electrode sheet in the part of the coating region where the resistance layer is not provided, the polarization parameter P of the positive electrode sheet falls within the specified range, so that the polarizability of the positive electrode sheet and the power performance of the battery can both reach required levels, and the power performance of the battery is ensured while an appropriate amount of active lithium is retained for the positive electrode sheet. Overall, the battery capacity decay is reduced while the power performance is ensured, and the cycle performance is significantly improved. For example, the number of cycles at which the battery capacity is maintained at 80% is significantly improved to more than 1100 cycles, while the 60 s pulse discharge power of the battery is maintained at more than 950 W.

In some embodiments, the polarization parameter P of the positive electrode sheet may be not less than 0.4, optionally, not less than 0.5, and optionally, not less than 1.5. In some embodiments, the polarization parameter P of the positive electrode sheet may be not greater than 65.0, optionally, not greater than 36.0, and optionally, not greater than 8.0. In some embodiments, for example, the polarization parameter P of the positive electrode sheet may be in a range of 0.4-65.0, optionally, may be in a range of 0.5-65.0, optionally, may be in a range of 1.5-65.0, optionally, may be in a range of 0.5-36.0, optionally, may be in a range of 1.5-36.0, optionally, may be in a range of 0.5-8.0, and optionally, may be in a range of 1.5-8.0. In some embodiments, the polarization parameter P of the positive electrode sheet may be in a range of 0.5-36.0, optionally, in a range of 1.5-8.0. When the polarization parameter P is within the example range, additionally, the cycle performance of the battery can be further improved, or the power performance of the battery can be better ensured, or even the power performance of the battery can be better ensured while the cycle performance of the battery is further improved additionally.

In some embodiments, the area ratio S of the resistance layer relative to the coating region of the current collector may be set in a range of 0.15-0.85. In addition, in combination with the ratio R1/R2 of the film resistance value R1 of the positive electrode sheet in the part where the resistance layer is provided to the film resistance value R2 of the positive electrode sheet in the part of the coating region where the resistance layer is not provided, the area ratio of the resistance layer relative to the coating region of the current collector is adjusted within an appropriate range, and the function of adjusting the amount of lithium retained in the positive electrode active material layer above the resistance layer may also be achieved, thereby allowing the amount of the active lithium retained in the positive electrode sheet to be adjusted so as to adjust the service life of the battery.

In some embodiments, the area ratio S of the resistance layer relative to the coating region of the current collector may be not less than 0.15, optionally, not less than 0.20, optionally, not less than 0.30, and optionally, not less than 0.40. In some embodiments, the area ratio S of the resistance layer relative to the coating region of the current collector may be not greater than 0.85, optionally, not greater than 0.80, optionally, not greater than 0.75, optionally, not greater than 0.70, and optionally, not greater than 0.60. In some embodiments, for example, the area ratio S of the resistance layer relative to the coating region of the current collector may be in a range of 0.15-0.85, optionally in a range of 0.15-0.80, optionally in a range of 0.15-0.75, optionally, in a range of 0.15 to 0.70, optionally in a range of 0.15-0.60, optionally in a range of 0.20-0.85, optionally in a range of 0.20-0.80, optionally in a range of 0.20-0.75, optionally in a range of 0.20-0.70, optionally in a range of 0.20-0.60, optionally in a range of 0.30-0.60, optionally in a range of 0.30-0.70, optionally in a range of 0.30-0.80, optionally in a range of 0.30-0.85, optionally in a range of 0.40-0.60, optionally in a range of 0.40-0.70, optionally in a range of 0.40-0.80, and optionally in a range of 0.40-0.85. In some embodiments, the area ratio S of the resistance layer relative to the coating region of the current collector may be in a range of 0.20-0.80, optionally in a range of 0.30-0.70, and optionally in a range of 0.40-0.60.

Figure 2:
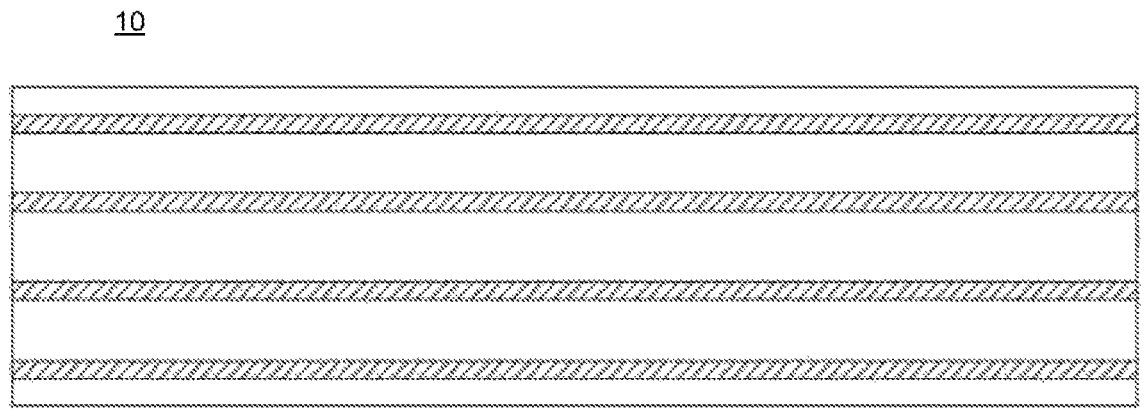
FIG. 2 is a schematic top view of the positive electrode sheet of the embodiment of the present application shown in FIG. 1.
Figure 3:
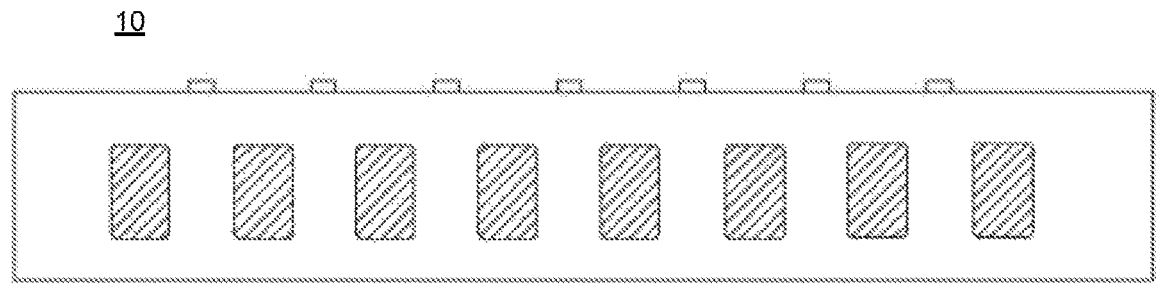
FIG. 3 is a schematic top view of a positive electrode sheet of one embodiment of the present application.

The resistance layer may be disposed on the current collector in any manner, as long as the ratio of the area of the resistance layer to the area of the coating region of the current collector satisfies the above range. As a non-limiting example, referring to FIGS. 1 and 2, the resistance layer 33 may be one or more parallel coatings disposed on the current collector 22 and being parallel to the longitudinal direction of the positive electrode sheet. As a non-limiting example, referring to FIG. 3, the resistance layer 33 may also be a plurality of parallel coatings disposed on the current collector 22 and being perpendicular to the longitudinal direction of the positive electrode sheet.

Figure 4:
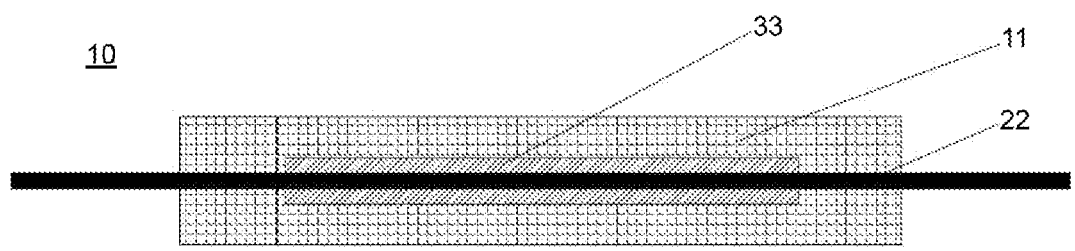
FIG. 4 is a schematic cross-sectional view of a positive electrode sheet in a thickness direction of one embodiment of the present application.

In the present application, the resistance layer including the first positive electrode active material may play the role of increasing the energy density of the battery while increasing the polarization of the positive electrode sheet. Referring to FIG. 4, as a non-limiting example, the projection of at least a part of the positive electrode active material layer 11 on the current collector 22 does not overlap the projection of the resistance layer 33 on the current collector 22. As shown in FIG. 4, optionally, the projection of a part of the positive electrode active material layer 11 on the current collector 22 overlaps the projection of the resistance layer 33 on the current collector 22.

The projection of a part of the positive electrode active material layer 11 on the current collector 22 overlaps the projection of the resistance layer 33 on the current collector 22; and at the same time, a projection of another part of the positive electrode active material layer 11 on the current collector 22 does not overlap the projection of the resistance layer 33 on the current collector 22.

Figure 5:
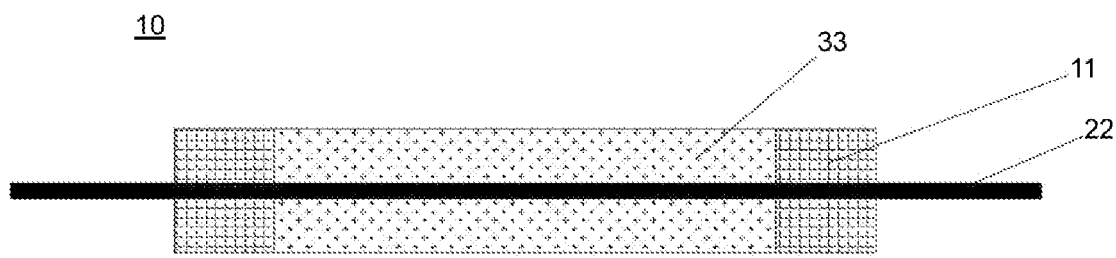
FIG. 5 is a schematic cross-sectional view of a positive electrode sheet in a thickness direction of one embodiment of the present application.

In another alternative embodiment, referring to FIG. 5, the projection of the positive electrode active material layer 11 on the current collector 22 does not overlap at all the projection of the resistance layer 33 on the current collector 22.

In the resistance layer 33, optionally, the mass content of the binder may be 10.0-85.0 wt % based on the total weight of the resistance layer. For example, in the resistance layer 33, the mass content of the binder may be 10.0-80.0 wt %, 10.0-70.0 wt %, 15.0-85.0 wt %, 15.0-80.0 wt % or 15.0-70.0 wt % based on the total weight of the resistance layer. Optionally, the mass content of the first positive electrode active material may be 10.0-70.0 wt % based on the total weight of the resistance layer. For example, in the resistance layer 33, the mass content of the first positive electrode active material may be 10.0-65.0 wt %, 10.0-60.0 wt %, 15.0-70.0 wt %, 15.0-65.0 wt % or 15.0-60.0 wt % based on the total weight of the resistance layer. Optionally, the mass content of the conductive agent may be 5.0-20.0 wt % based on the total weight of the resistance layer. For example, in the resistance layer 33, the mass content of the conductive agent may be 5.0-15.0 wt %, 10.0-20.0 wt %, 10.0-15.0 wt % or 15.0-20.0 wt % based on the total weight of the resistance layer.

Optionally, the positive electrode active material layer may be a conventional positive electrode active material layer commonly used in the art. Therefore, the second positive electrode active material, the conductive agent and the binder in the positive electrode active material layer may all adopt conventional contents generally used in the art.

In some embodiments, the ratio R1/R2 of the film resistance value R1 of the positive electrode sheet in the part where the resistance layer is provided to the film resistance value R2 of the positive electrode sheet in the part of the coating region where the resistance layer is not provided may be set in a range of 1.15-26.00. The ratio R1/R2 is set within a specified range, so that the resistance difference between the positive electrode sheet in the part where the resistance layer is provided and the positive electrode sheet in the part of the coating region where the resistance layer is not provided is within a certain range. On the one hand, it can ensure that the ion migration rate of the positive electrode sheet in the part of the current collector where the resistance layer is not provided will not be too large to undesirably cause too much retention of lithium ions of the electrode sheet in the part of the current collector where the resistance layer is provided and reduction of the battery capacity; and on the other hand, it can prevent the difference between the above two parts from being too small to hardly retain active lithium. Combined with the area ratio of the resistance layer relative to the coating region of the current collector, the ratio R1/R2 is adjusted within an appropriate range, it can also play a role in adjusting the amount of active lithium retained in the positive electrode active material layer above the resistance layer so as to flexibly adjust the service life of the battery. Optionally, R1/R2 may be 1.15-20.00, 1.15-15.00, 1.15-10.00, 2.00-26.00, 2.00-20.00, 2.00-15.00, 2.00-10.00, 3.00-26.00, 3.00-20.00, 3.00-15.00 or 3.00-10.00.

Optionally, adjusting the ratio R1/R2 is mainly performed by adjusting the film resistance value R1 of the positive electrode sheet in the part where the resistance layer is provided. As described above, the positive electrode active material layer of the positive electrode sheet may be a conventional positive electrode active material layer commonly used in the art. In this case, the adjustment of R1 is mainly determined by adjusting the resistance of the resistance layer.

As a non-limiting example, R1 may be in a range of 0.3-8.0Ω. Optionally, R1 may be 0.5-7.0Ω, 1.0-7.0Ω, 1.0-6.0Ω, 1.0-5.0Ω, 2.0-8.0Ω, 2.0-7.0Ω, 2.0-6.0Ω, 3.0-8.0Ω, 3.0-7.0Ω, 3.0-6.0Ω or 3.0-5.0Ω. As a non-limiting example, R2 may be in a range of 0.3-4.0Ω. Optionally, R2 may be 0.3-3.5Ω, 0.3-2.0Ω, 0.3-1.0Ω, 0.3-0.5Ω, 0.2-3.5Ω, 0.2-2.0Ω, 0.2-1.0Ω or 0.2-0.5Ω.

In the present application, the first positive electrode active material included in the resistance layer and the second positive electrode active material included in the positive electrode active material layer may be the same or different.

In some embodiments, when the positive electrode sheet of the present disclosure is applied to a lithium-ion secondary battery, the first positive electrode active material and the second positive electrode active material may each include one or more selected from lithium cobalt oxide, lithium manganate, lithium nickel cobalt manganese oxide, lithium nickel cobalt aluminium oxide, lithium iron phosphate and lithium manganese nickel oxide. As a non-limiting example, the first positive electrode active material and the second positive active material may each include one or more selected from $LiNi_{0.55}Co_{0.05}Mn_{0.4}O_2$, $LiCoO_2$, $LiNiO_2$, $LiMnO_2$, $LiMn_2O_4$, $LiNi_{1/3}Co_{1/3}Mn_{1/3}O_2$(NCM333), $LiNi_{0.5}Co_{0.02}Mn_{0.3}O_2$(NCM523), $LiNi_{0.6}Co_{0.02}Mn_{0.2}O_2$ (NCM622), $LiNi_{0.8}Co_{0.1}Mn_{0.1}O_2$(NCM811), $LiNi_{0.85}Co_{0.15}Al_{0.05}O_2$, $LiFePO_4$(LFP) and $LiMnPO_4$.

In some embodiments, when the positive electrode sheet of the present disclosure is applied to a sodium-ion secondary battery, the first positive electrode active material and the second positive electrode active material may each include one or more selected from a layered transition metal oxide, a polyanionic compound, a Prussian blue compound, sulfides, nitrides, carbides, and titanates. As a non-limiting example, the first positive electrode active material and the second positive electrode active material may each include one or more selected from $NaCrO_2$, $Na_2Fe_2(SO_4)_3$, molybdenum disulfide, tungsten disulfide, vanadium disulfide, titanium disulfide, hexagonal boron nitride, carbon-doped hexagonal boron nitride, titanium carbide, tantalum carbide, molybdenum carbide, silicon carbide, $Na_2Ti_3O_7$, $Na_2Ti_6O_{13}$, $Na_4Ti_5O_{12}$, $Li_4Ti_5O_{12}$ and $NaTi_2(PO_4)_3$.

Optionally, the conductive agent may include one or more selected from graphite, carbon black, acetylene black, graphene, and carbon nanotubes. Optionally, the binder may include one or more selected from polyvinylidene fluoride, polyacrylic acid, polytetrafluoroethylene and polyimide.

In some embodiments, a compaction density of the positive electrode sheet may be 2.0-4.0 $g/cm^3$, in some embodiments 2.3-4.0 $g/cm^3$. Setting the compaction density of the electrode sheet within the above range can not only reduce the thickness of the electrode sheet and increase the energy density of the battery, but also reduce an active lithium shuttle path and improve the charge and discharge rate and power. Optionally, the compaction density of the positive electrode sheet may be 2.0-3.3 $g/cm^3$, 2.0-3.5 $g/cm^3$, 2.0-4.0 $g/cm^3$, 2.2-3.3 $g/cm^3$, 2.2-3.5 $g/cm^3$, 3.0-4.0 $g/cm^3$, 3.0-3.3 $g/cm^3$ or 2.2-3.5 $g/cm^3$.

In some embodiments, a thickness of the current collector may be 8-14 μm, in some embodiments 10-13 μm. By setting the thickness of the current collector within the above range, the following additional effects can be achieved: the weight of the current collector can be reduced and the energy density can be increased, and the current flow will not be hindered due to the thin current collector. Optionally, the thickness of the current collector may be 8-13 μm, 9-14 μm, 9-13 μm or 10-14 μm. Optionally, the thickness of the positive electrode sheet is 100-200 μm. As a non-limiting example, the thickness of the positive electrode sheet may be 100-180 μm, 100-160 μm, 120-200 μm, 120-180 μm or 120-160 μm. Optionally, the thickness of the resistance layer is 1-30 μm, in some embodiments 10-13 μm. As a non-limiting example, the thickness of the resistance layer may be 1-25 μm, 1-20 μm, 4-30 μm, 4-25 μm, 4-20 μm, 7-30 μm, 7-25 μm, 7-20 μm, 10-30 μm, 10-25 μm or 10-20 μm.

In some embodiments, $D_v50$ of at least one of the first positive electrode active material and the second positive electrode active material is 1-20 μm. Setting the particle size of the positive electrode active material within the above range can further help the positive electrode sheet to retain an appropriate amount of active lithium. Specifically, when the particle size is large, the migration of lithium ions from the inside of particles to the outside of the particles will cause polarization. Therefore, a larger particle size can be used to increase the polarization, when charging starts, a too long deintercalation path of a part of the lithium ions towards the outside of the particles will make the lithium ions still retained inside the particles after charging, and subsequently retained lithium ions will be gradually released as the particles are broken and the migration path is shortened during the cycle, thereby further slowing the decay of the battery capacity and further increasing the cycle life of the battery. When the particle size becomes too large, the increase in polarization brought about by the increase in particle size can difficultly offset the concomitant detrimental effect of the lowered particle dispersibility on battery performance. Therefore, in some embodiments, $D_v50$ of at least one of the first positive electrode active material and the second positive electrode active material may be 5-12 μm. Optionally, $D_v50$ of at least one of the first positive electrode active material and the second positive electrode active material may be 1-18 μm, 1-15 μm, 2-20 μm, 2-18 μm, 2-15 μm, 3-20 μm or 3-18 μm.

In the positive electrode sheet, the current collector has two surfaces opposite in its own thickness direction. In some embodiments, the coating region of the current collector may be provided on either or both of the two opposing surfaces of the positive electrode current collector.

The positive electrode current collector may include metal foil or a composite current collector. As a non-limiting example, the metal foil may include aluminum foil. In some embodiments, the composite current collector may include a high molecular material substrate layer and a metal layer formed on at least one surface of the high molecular material substrate layer. As a non-limiting example, the composite current collector may be formed by forming a metal material (aluminium, aluminium alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In the preparation of the positive electrode sheet of the present application, the resistance layer of the present application may be first formed on the current collector, and then the positive electrode active material layer may be formed on the current collector on which the resistance layer is formed.

As an example, a method for forming the resistance layer of the present application on the current collector may include the following steps: mixing the conductive agent, the binder and the first positive electrode active material according to a certain mass ratio, adding, for example, into N-methylpyrrolidone (NMP), and stirring uniformly under the action of a vacuum stirrer to obtain slurry for the resistance layer with a certain solid content. A target region of the current collector is coated with the slurry for the resistance layer uniformly by a conventional coating method (for example, using an extrusion coater or a transfer coater), and is oven-dried at a suitable temperature (for example, 85° C.) to form the resistance layer of the present application on the current collector.

As an example, a method for forming the positive electrode active material layer on the current collector on which the resistance layer is formed may include the following steps: mixing the second positive electrode active material, the conductive agent and the binder according to a certain mass ratio, adding, for example, into N-methylpyrrolidone (NMP), and stirring uniformly under the action of a vacuum stirrer to obtain slurry for the positive electrode active material layer with a certain solid content (e.g., 60 wt %). A target region of the current collector on which the resistance layer is formed is coated with the slurry for the positive electrode active material layer uniformly by a conventional coating method (for example, using an extrusion coater or a transfer coater), and is oven-dried at a suitable temperature (for example, 85° C.) to form the positive electrode active material layer on the current collector on which the resistance layer is formed.

In another aspect, the present application also provides a secondary battery, including a positive electrode, a negative electrode, an electrolyte and a separator, wherein the positive electrode includes the above-mentioned positive electrode sheet for the secondary battery of the present application.

The present application further provides a battery module, including the secondary battery of the present application as described above.

The present application further provides a battery pack, including the battery module of the present application as described above.

The present application further provides an electrical apparatus, including the secondary battery of the present application as described above, or the battery module of the present application as described above, or the battery pack of the present application as described above, or a combination thereof.

In the secondary battery of the present application, by applying the positive electrode sheet provided with the resistance layer of the present application to the battery, the deintercalated speed of active lithium ions in partial regions of the positive electrode sheet is slowed down, so that part of lithium is retained in the regions (because during charging, compared with a conventional positive electrode active material layer, the deintercalated speed of the active lithium ions in the regions is slower, part of the lithium can be retained at the end of charging). During the subsequent cycle of the battery, with the gradual aging of the battery, the lithium ions retained in the partial regions of the positive electrode sheet above are gradually released, and the battery capacity shows a trend of increasing first and then gradually decreasing, thereby slowing down the decay of the battery capacity and increasing the service life of the battery.

The secondary battery, battery module, battery pack and apparatus of the present application will be described hereafter with appropriate reference to the drawings.

In an embodiment of the present application, a secondary battery is provided.

Generally, the secondary battery includes a positive electrode sheet, a negative electrode sheet, an electrolyte, and a separator. In the charging and discharging process of the battery, active ions are intercalated and deintercalated back and forth between the positive electrode sheet and the negative electrode sheet. The electrolyte serves to conduct ions between the positive electrode sheet and the negative electrode sheet. The separator is provided between the positive electrode sheet and the negative electrode sheet, and mainly functions to prevent a short circuit between the positive electrode and the negative electrode while allowing ions to pass through.

[Negative Electrode Sheet]

The negative electrode sheet includes a negative electrode current collector and a negative electrode active material layer arranged on at least one surface of the negative electrode current collector, and the negative electrode active material layer includes a negative electrode active material.

In the secondary battery of the present application, the negative electrode active material commonly used for preparing a negative electrode of a secondary battery in the art can be used as the negative electrode active material. The negative electrode active material may be listed as follows: artificial graphite, natural graphite, soft carbon, hard carbon, silicon-based materials, tin-based materials, lithium titanate, and the like. The silicon-based material may be one or more selected from elemental silicon, a silicon oxide compound (e.g., silicon monoxide), a silicon-carbon composite, a silicon-nitrogen composite and silicon alloy. The tin-based material may be selected from one or more of elemental tin, a tin-oxygen compound and tin alloy.

The negative electrode current collector has two surfaces opposite in its own thickness direction. As an example, the negative electrode active material layer may be arranged on either or both of the two opposite surfaces of the negative electrode current collector.

In the secondary battery of the present application, the negative electrode current collector may include metal foil or a composite current collector. As a non-limiting example, the metal foil may include copper foil. In some embodiments, the composite current collector may include a high molecular material substrate layer and a metal layer formed on at least one surface of the high molecular material substrate layer. As a non-limiting example, the composite current collector may be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In the secondary battery of the present application, the negative electrode active material layer usually includes a negative electrode active material, an optional binder, an optional conductive agent and other optional adjuvants, and is usually formed by coating and drying of slurry for the negative electrode active material layer. The slurry for the negative electrode active material layer is generally formed by dispersing the negative electrode active material as well as the optional conductive agent and the binder, etc. in a solvent and uniformly stirring. The solvent may be N-methyl pyrrolidone (NMP) or deionized water.

As an example, the conductive agent may be one or more selected from superconducting carbon, acetylene black, carbon black, Ketjen black, carbon dot, carbon nanotube, graphene, and carbon nanofiber.

By way of example, the binder may be selected from one or more of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

Other optional adjuvants are for example a thickener (such as sodium carboxymethylcellulose (CMC-Na)) and the like.

In some embodiments, the positive electrode sheet, the negative electrode sheet, and the separator may be made into an electrode assembly by a winding process or a lamination process.

[Electrolyte]

The examples of the present application have no specific limitation on the type of the electrolyte, which can be selected according to requirements. For example, the electrolyte can be solid or liquid.

In some embodiments, the electrolyte is liquid and typically includes an electrolyte salt and a solvent.

As an example, the electrolyte salt may be one or more selected from lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluoro bis(oxalato)phosphate (LiDFOP) and lithium tetrafluoro(oxalato)phosphate (LiTFOP).

As an example, the solvent may be one or more selected from fluoroethylene carbonate (FEC), ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methylsulfonylmethane (MSM), ethyl methyl sulfone (EMS) and ethylsulfonylethane (ESE).

In some embodiments, an additive is optionally included in the electrolyte. For example, the electrolyte may include a negative electrode film-forming additive, a positive electrode film-forming additive, an additive for improving the overcharge performance of the battery, an additive for improving the high temperature performance of the battery, an additive for improving the low temperature performance of the battery, and the like.

[Separator]

The separator separates the positive electrode sheet from the negative electrode sheet, preventing a short circuit in the battery, and enabling active ions to move between the positive and negative electrodes through the separator. In the secondary battery of the present application, the type of the separator is not particularly limited, and any well-known separator with a porous structure having good chemical stability and mechanical stability may be selected.

In some embodiments, a material of the separator may be one or more selected from a thin glass fiber film, a thin non-woven cloth film, a thin polyethylene (PE) film, a thin polypropylene (PP) film, a thin polyvinylidene fluoride film, and a multilayer composite thin film including one or more than two of the above. The separator may be a single-layer separator or a multi-layer composite separator, which is not particularly limited. When the separator is a multi-layer composite separator, the material of each layer may be the same or different, which is not particularly limited.

In some embodiments, the positive electrode sheet, the negative electrode sheet, and the separator may be made into an electrode assembly by a winding process or a lamination process.

In some embodiments, the secondary battery may include an outer package. The outer package may be used to encapsulate the above-mentioned electrode assembly and electrolyte solution.

In some embodiments, the outer package of the secondary battery may be a hard case, such as a hard plastic case, an aluminium case, a steel case, and the like. The outer package of the secondary battery can also be a soft pack, such as a bag-type soft pack. The material of the soft package may be plastic, and examples of the plastic include polypropylene (PP), polybutylene terephthalate (PBT), polybutylene succinate (PBS), and the like.

Figure 6:
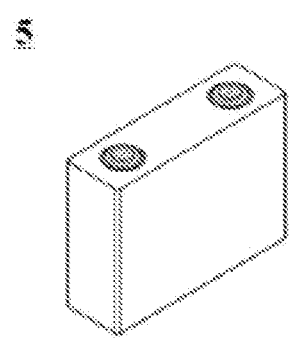
FIG. 6 is a schematic diagram of a secondary battery of one embodiment of the present application.

The shape of the secondary battery is not particularly limited in the present application, and it may be cylindrical, square, or any other shape. For example, FIG. 6 is an example of a secondary battery 5 having a square structure.

Figure 7:
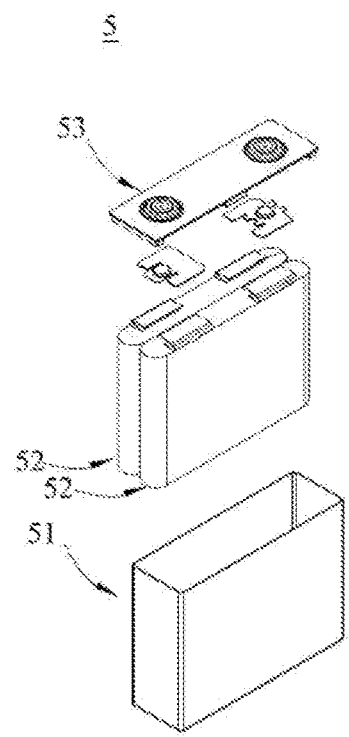
FIG. 7 is an exploded diagram of the secondary battery of the embodiment of the present application shown in FIG. 6.

In some embodiments, referring to FIG. 7, the outer package may include a case 51 and a cover plate 53. Here, the case 51 may include a bottom plate and a side plate connected to the bottom plate, with the bottom plate and the side plate enclosing to form an accommodating cavity. The case 51 has an opening in communication with the accommodating cavity, and the cover plate 53 may cover the opening to close the accommodating cavity. The positive electrode sheet, the negative electrode sheet, and the separator may be formed into an electrode assembly 52 by a winding process or a lamination process. The electrode assembly 52 is encapsulated in the accommodating cavity. The electrolyte solution impregnates the electrode assembly 52. The number of electrode assemblies 52 included in the secondary battery 5 may be one or more, which can be selected by those skilled in the art according to specific actual requirements.

In some embodiments, the secondary batteries may be assembled into a battery module, and the number of the secondary batteries included in the battery module may be one or more, and the specific number may be selected by those skilled in the art according to the application and capacity of the battery module.

Figure 8:
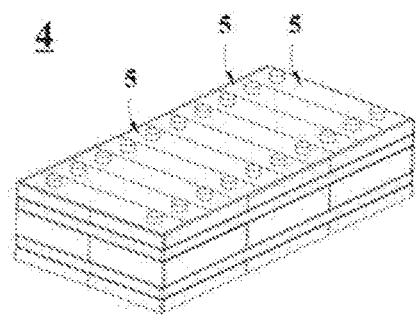
FIG. 8 is a schematic diagram of a battery module of one embodiment of the present application.

FIG. 8 is an example of a battery module 4. Referring to FIG. 8, in the battery module 4, a plurality of secondary batteries 5 may be sequentially arranged along the length direction of the battery module 4. In another aspect, any other arrangement of the plurality of secondary batteries 5 is also possible. In addition, the plurality of secondary batteries 5 may be fixed by fasteners.

Optionally, the battery module 4 may further include a case having an accommodating space, in which the plurality of secondary batteries 5 are accommodated.

In some embodiments, the above-mentioned battery modules may further be assembled into a battery pack. The number of the battery modules contained in the battery pack may be selected by those skilled in the art according to the use of the battery pack.

Figure 9:
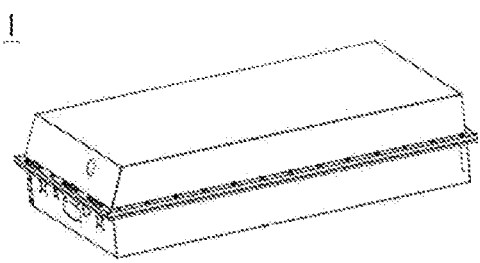
FIG. 9 is a schematic diagram of a battery pack of one embodiment of the present application.
Figure 10:
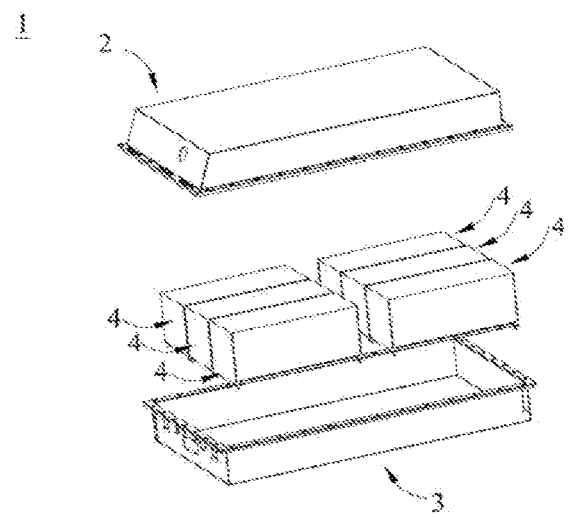
FIG. 10 is an exploded diagram of the battery pack of the embodiment of the present application shown in FIG. 9.

FIGS. 9 and 10 are an example of a battery pack 1. Referring to FIG. 9 and FIG. 10, the battery pack 1 may include a battery box and a plurality of battery modules 4 arranged in the battery box. The battery box includes an upper box 2 and a lower box 3, wherein the upper box 2 may cover the lower box 3 and forms an enclosed space for accommodating the battery modules 4. The plurality of battery modules 4 may be arranged in the battery box in any manner.

In addition, the present application further provides an electrical apparatus, and the electrical apparatus includes one or more of the secondary battery, the battery module, or the battery pack provided by the present application. The secondary battery, battery module, or battery pack may be used as a power source for the electrical apparatus, and may also be used as an energy storage unit for the electrical apparatus. The electrical apparatus may be, but is not limited to, a mobile device (such as a mobile phone and a laptop), an electric vehicle (such as an all-electric vehicle, a hybrid electric vehicle, a plug-in hybrid electric vehicle, an electric bicycle, an electric scooter, an electric golf cart, and an electric truck), an electric train, a ship, a satellite, an energy storage system, etc.

For the electrical apparatus, the secondary battery, battery module, or battery pack can be selected according to its use requirements.

Figure 11:
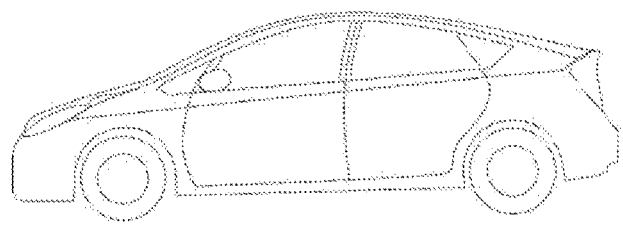
FIG. 11 is a schematic diagram of an electrical apparatus in which a secondary battery is used as a power source of one embodiment of the present application.
Figure 12:
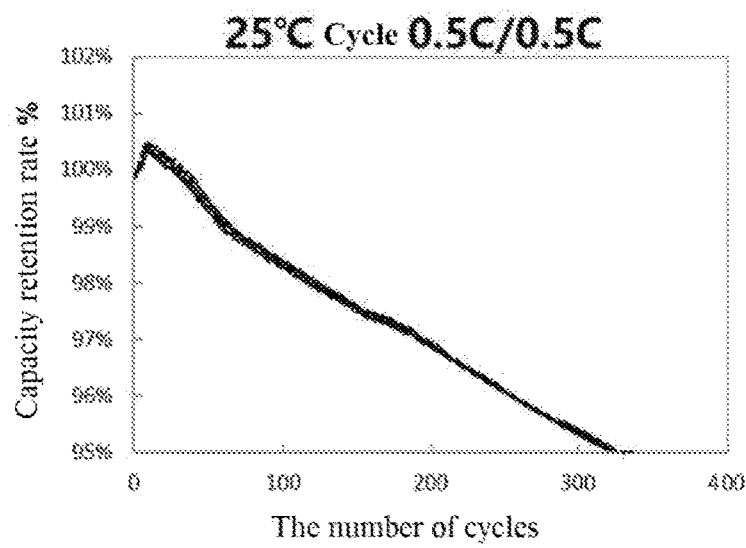
FIG. 12 is a graph of cycle performance of a secondary battery obtained in example 7.

FIG. 11 is an example of an electrical apparatus. The apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

As another example, the electrical apparatus may be a mobile phone, a tablet, a laptop, etc. The apparatus is generally required to be light and thin, and may use a secondary battery as a power source.

The above summary of the disclosure of the present application is not intended to describe each disclosed embodiment or every implementation in the present application. The following description illustrates exemplary embodiments in more detail. In various places throughout the present application, guidance is provided through a series of examples, and these examples can be used in various combinations. In various examples, the enumeration is merely a representative group, and should not be construed as exhaustive.

EXAMPLES

In the following examples, unless specific conditions are indicated, it means that the described steps are carried out in accordance with conventional conditions or conditions suggested by the manufacturer. Where manufacturers are not specified, the reagents or instruments used are conventional products and are commercially available. The general method of battery preparation (hereinafter referred to as general method) is described below.

Preparation of Positive Electrode Sheet (1) Preparation of Slurry for Resistance Layer A conductive agent Super P, a binder polyvinylidene fluoride (PVDF) and a positive electrode active material $LiNi_{0.55}Co_{0.05}Mn_{0.4}O_2$ were mixed in a certain mass ratio. An obtained mixture was added to a solvent N-methylpyrrolidone (NMP), and stirred uniformly under the action of a lithium-ion battery slurry mixer (Shanghai Baomian Electromechanical Equipment Co., Ltd., Model BMXJS-2000L) to obtain slurry for a resistance layer.

(2) Preparation of Slurry for Positive Electrode Active Material Layer

A positive electrode active material $LiNi_{0.55}Co_{0.05}Mn_{0.4}O_2$, a conductive agent Super P and a binder polyvinylidene fluoride (PVDF) were mixed in a mass ratio of 96:2.5:1.5, and a solvent N-methylpyrrolidone (NMP) was added and stirred uniformly in a vacuum stirrer to obtain slurry for a positive electrode active material layer. The solid content in the slurry was 60 wt %.

(3) Preparation of Positive Electrode Sheet

A target region of a current collector was uniformly coated with the slurry for the resistance layer prepared as described above by an extrusion coater. Specifically, a lithium battery slot extrusion coater (Guangdong Hongbao Technology Co., Ltd., HB-TBY750) was used to coat aluminum foil with a thickness of 8-14 μm uniformly with the slurry for the positive electrode active material layer prepared as described above at a coating speed of 36 m/min, with the coating weight being 0.9 mg/cm$^2$, wherein the length of a slurry nozzle of an extrusion nozzle of the extrusion coater was controlled by controlling a coating spacer with a specific-width opening, and then a width-controlled undercoat layer arranged along the longitudinal length of the aluminum foil can be obtained. Alternatively and optionally, it is also possible to intermittently control a pressure switch for extrusion of the nozzle, so as to obtain a width-controlled undercoat layer arranged in a direction perpendicular to the longitudinal length of the aluminum foil. The obtained positive electrode current collector aluminum foil with the undercoat layer was oven-dried at 85° C., thereby forming a resistance layer with a thickness of 1-30 μm on the positive electrode current collector aluminum foil.

Next, a target region of the positive electrode current collector aluminum foil on which the resistance layer was formed is uniformly coated with the slurry for the positive electrode active material layer prepared as described above. Coating of the slurry for the positive electrode active material layer may be performed by the same method as the coating method of the slurry for the resistance layer described above. Alternatively and optionally, a transfer coater may also be used for coating. Specifically, a transfer coater (Yakang Precision Machinery Co., Ltd., DT600/750) was used to uniformly coat the target region of the current collector on which the resistance layer of the present application was formed with the slurry for the positive electrode active material layer by using a process conventional in the art, and then the current collector was oven-dried at 85° C. to form a positive electrode active material layer on the current collector aluminum foil on which the resistance layer was formed.

Then, cold-pressing, trimming, cutting and slitting were performed on obtained laminate through conventional processes to obtain a positive electrode sheet with a thickness of 100-200 μm.

Measurement of Dv50 of Positive Electrode Active Material

In the present application, a Dv50 value of the positive electrode active material refers to the median particle size of the positive electrode active material. Specifically, a specific Dv50 value indicates that the diameter of particles accounting for 50% of the total volume is larger than the value, and the diameter of particles accounting for 50% of the total volume is smaller than the value.

The Dv50 value of the positive electrode active material may be measured with reference to a method specified in GB/T19077-2016. More specifically, the Dv50 value may be measured according to a following method.

Sample pretreatment: a clean beaker was taken, an appropriate amount of a sample to be tested was added, a surfactant sodium dodecyl sulfate was added dropwise, then deionized water was added as a dispersant, and ultrasonic treatment (120 W/5 min) was performed to ensure that the sample was completely dispersed in the dispersant.

Test: an LS-909 laser particle size analyzer (Omega) was used to measure Dv50. After the sample was poured into an injection tower, the sample was circulated to a test optical path system with a solution, scattered light emitted by particles under the irradiation of a laser beam was received, and the energy distribution thereof is measured, so a particle size distribution feature of the particles can be obtained (shading degree: 8-12%), and the Dv50 value of the material was finally obtained.

Measurement of Film Resistance Value of Positive Electrode Sheet

The film resistance value of the positive electrode sheet in the part provided with the resistance layer and the film resistance value of the positive electrode sheet in the part of the coating region without the resistance layer were both measured using a conventional electrode sheet resistance meter (Initial Energy Science & Technology, IEST BER1000). Specifically, a square detection sample with a size of 10 cm×10 cm was cut from the to-be-measured part of the positive electrode sheet. At a measurement site, upper and lower sides of the detected sample were clamped between two conductive terminals of the resistance meter, a certain pressure was applied for fixation, and the resistance R of the detected sample was tested. The diameter of the conductive terminals of the resistance meter was 14 mm, the pressure applied during the measurement was 5 MPa to 27 MPa, and a sampling time range was 5 s to 17 s. R is the resistance value of the sample read by the resistance meter. The film resistance value measured at the part where the resistance layer is provided is denoted as R1. The film resistance value measured at the part of the coating region where the resistance layer is not provided is denoted as R2.

Through the definition of a polarization parameter P: $P=((1-S)/S)\cdot(R1/R2)$, the polarization parameter P of the positive electrode sheet can be obtained.

Preparation of Battery (1) Preparation of Negative Electrode Sheet

A negative electrode active material artificial graphite, a conductive agent Super P, a thickener sodium carboxymethyl cellulose (CMC) and a binder styrene butadiene rubber emulsion (SBR) were mixed at a mass ratio of 97:0.7:1.8:0.5, and added into deionized water and stirred uniformly under the action of a vacuum stirrer to obtain negative electrode slurry. The solid content in the negative electrode slurry was 56 wt %.

Through a conventional process, negative electrode current collector copper foil was uniformly coated with the negative electrode slurry by an extrusion coater or a transfer coater, oven-dried at 85° C., and then subjected to cold pressing, trimming, cutting and slitting to obtain a negative electrode sheet.

(2) Preparation of Electrolyte Solution

In an argon atmosphere glove box with the water content <10 ppm, a fully dried lithium salt ($LiPF_6$) was dissolved in a mixed solvent of ethylene carbonate (EC), ethyl methyl carbonate (EMC) and diethyl carbonate (DEC) with a volume ratio of 20:20:60, and then an additive vinylene carbonate (VC) was added to be mixed evenly to obtain an electrolyte solution. The concentration of the lithium salt therein was 1 mol/L.

(3) Preparation of Separator

A polyethylene film (PE) with a thickness of 7 μm was used as a base film of a separator, and alumina, sodium carboxymethyl cellulose (CMC) and acrylate with the weight ratio of 93%:3%:4% were added into deionized water and stirred uniformly under the action of a vacuum stirrer to obtain slurry, wherein the solid content in the slurry was 55 wt %. The obtained slurry was uniformly sprayed on both surfaces of the base film with a thickness of 2 μm on one side to obtain a separator.

(4) Assembly of Lithium-Ion Battery

The positive electrode sheet, the separator and the negative electrode sheet were stacked in sequence, so that the separator was positioned between the positive electrode sheet and the negative electrode sheet to serve for isolation. Then, obtained laminate was wound into a square bare cell, tabs were welded, the bare cell was put into a square aluminum case, and a top cover was laser welded. Then, after vacuum baking at 80° C. to remove water, the electrolyte solution was injected and sealed. After that, after procedures such as standing at 45° C., forming (charging at a 0.02C constant current to 3.3 V, and then charging at a 0.1C constant current to 3.6 V), shaping and capacity testing, a finished hard-shell lithium-ion battery was obtained with a thickness of 28 mm, a width of 97.5 mm, and a length of 148 mm.

Measurement of Battery Performance (1) Measurement of Number of Cycles

The cycle performance of a battery including the positive electrode sheet of the present application was evaluated under the condition of 0.5C/0.5C at a temperature of 25° C. Specifically, the cell was placed in a Nebula battery charge-discharge test system (model BAT-NEEFLCT-05300-V012), and charged with a constant current and a constant voltage at a rate of 0.5C to a charging cut-off voltage of 4.4 V, the cell was discharged with a constant current at a rate of 0.5C to a discharge cut-off voltage of 2.5 V after standing for 5 minutes, the discharge capacity was recorded, and then standing was performed for 5 minutes, and so on. The number of cycles in which the discharge capacity remained above 80% of the initial capacity was recorded.

(2) Measurement of 60 s Pulse Discharge Power

By measuring the 60 s pulse discharge power of the battery, the power performance of the battery can be determined. Specifically, the cell was placed in the Nebula battery charge-discharge test system at 25° C., charged with a constant current and a constant voltage at a rate of 0.5C to a charge cut-off voltage of 4.4 V, and discharged at specific power after standing for 5 minutes to ensure that discharge is stopped when the voltage of the battery just reached 2.5 V at 60 s, and the power at this time is the 60 s pulse discharge power.

Examples 1-6

The positive electrode sheet and the battery were prepared according to the general method described above. The thickness of the aluminum foil as the current collector was 12 μm. The thickness of the resistance layer provided on the current collector was 10 μm. The Dv50 of the positive electrode active material in the positive electrode active material layer was 4 μm. The thickness of the positive electrode sheet was 180 μm, and the compaction density was 3.4 $g/cm^3$.

In addition, a projection of a part of the positive electrode active material layer on the current collector overlapped a projection of the resistance layer on the current collector, as shown in FIG. 4.

The composition of the resistance layer in the positive electrode sheet, the area ratio S of the resistance layer relative to the coating region of the current collector, the film resistance value R1 of the part provided with the resistance layer, the film resistance value R2 of the part without the resistance layer, a corresponding value of R1/R2, a value of the polarization parameter P and the number of cycles and 60 s pulse discharge power of the battery measured by the performance test method described above are shown in Table 1 below.

In a control example of the existing technology, the resistance layer of the present disclosure is not provided on the current collector. Therefore, the positive electrode sheet only includes the current collector and the positive electrode active material layer. Performance test results of the control example are also shown in Table 1 below.

In addition, by adjusting the composition of the resistance layer, specifically by adjusting the respective mass contents of the binder, the conductive agent and the positive electrode active material in the resistance layer to adjust the resistance

TABLE 1

|  |  | Example 1 | Example 2 | Example 3 | Example 4 | Example 5 | Example 6 | Comparative Example 1 | Comparative Example 2 | Control Example |
|---|---|---|---|---|---|---|---|---|---|---|
| Resistance layer Composition | Binder Mass content | 80% | 70% | 50% | 30% | 20% | 85% | 99% | 95% | Not provided with Resistance layer |
|  | Conductive agent Mass content | 10% | 10% | 10% | 10% | 10% | 10% | 0 | 0 |  |
|  | Positive electrode active material Mass content | 10% | 20% | 40% | 60% | 70% | 5% | 1% | 5% |  |
| R1 (Ω) |  | 2.43 | 2.11 | 1.87 | 1.16 | 0.64 | 2.87 | 18.77 | 15.43 | — |
| R2 (Ω) |  | 0.35 | 0.35 | 0.35 | 0.35 | 0.35 | 0.35 | 0.35 | 0.35 | 0.35 |
| R1/R2 |  | 6.94 | 6.03 | 5.34 | 3.31 | 1.83 | 8.2 | 53.62 | 44.08 | — |
| S |  | 0.40 | 0.40 | 0.40 | 0.40 | 0.40 | 0.40 | 0.40 | 0.40 | — |
| P |  | 10.41 | 9.04 | 8.01 | 4.97 | 2.74 | 12.30 | 80.44 | 66.13 | — |
| Number of cycles (times) |  | 2388 | 2465 | 2645 | 2570 | 2463 | 1711 | 1123 | 937 | 835 |
| 60 s pulse discharge power (W) |  | 1363.0 | 1407.0 | 1509.7 | 1466.9 | 1405.8 | 976.6 | 933.0 | 828.0 | 1620.8 |

As can be seen from the results shown in Table 1, in the structure shown in FIG. 4, compared with the control example in which the resistance layer is not provided, by providing the resistance layer on the current collector, and making the projection of a part of the positive electrode active material layer on the current collector overlapping the projection of the resistance layer on the current collector, the cycle performance of the secondary batteries of Examples 1 to 6 is significantly improved, and the number of cycles at which the discharge capacity remains above 80% of the initial capacity is significantly increased from 835 times to more than 1700 times, so that the service lives of the batteries are greatly prolonged. In addition, the resistance layer includes a certain mass content of positive electrode active material, which can increase the polarization of the positive electrode sheet while improving the energy density of the battery, thereby ensuring that the battery has good power performance. The 60 s pulse discharge power of the battery is maintained at 950 W or more.

In Examples 1 to 6, by applying the binder with the higher mass content, a higher resistance value can be achieved in the resistance layer, so that the film resistance value (R1) of the positive electrode sheet in the part where the resistance layer is provided is greater than the film resistance value (R2=0.35Ω) of the part where the resistance layer is not provided, which produces appropriate lithium ion polarization in the positive electrode sheet. Therefore, in the part of the positive electrode sheet where the resistance layer is provided, the deintercalation speed of active lithium ions is slowed down, so that part of the lithium remains in this part. During the subsequent cycle of the battery, with the gradual aging of the battery, the active lithium retained in the region is gradually released, and the battery capacity shows a trend of increasing first and then gradually decreasing, thereby slowing down the decay of the battery capacity and increasing the service life of the battery.

value of the resistance layer, it is possible to adjust the positive electrode active material layer above the resistance layer. Therefore, the amount of active lithium retained in the positive electrode sheet can be adjusted, and the service life of the battery can be adjusted according to needs.

In Comparative Examples 1 and 2, in the case where the area ratio of the resistance layer relative to the coating region of the current collector is also 0.40, a ratio of the film resistance value R1 of the part provided with the resistance layer relative to the film resistance value R2 of the part not provided with the resistance layer is relatively large, which causes the polarization parameter of the positive electrode sheet to be too large, which exceeds the range of 0.4-65.0. Although compared with the control example not provided with the resistance layer, the number of cycles in which the discharge capacity is kept above 80% of the initial capacity is increased, but the resistance of the resistance layer is too large, which affects the power performance of the battery to a certain extent, and the 60 s pulse discharge power of the battery is less than 950 W.

Therefore, compared with Comparative Examples 1 and 2, in Examples 1-6, by adjusting the composition of the resistance layer to make the polarization parameter P of the positive electrode sheet in the range of 0.4-65.0, an appropriate amount of active lithium is retained for the positive electrode sheet while the power performance of the battery is ensured, thereby increasing the service life of the battery.

Examples 7-10

The positive electrode sheet and the battery were prepared according to the general method described above. The thickness of the aluminum foil as the current collector was 12 μm. The thickness of the resistance layer provided on the current collector was 10 μm. The Dv50 of the positive electrode active material in the positive electrode active material layer was 4 μm. The thickness of the positive electrode sheet was 180 μm, and the compaction density was 3.4 g/cm$^3$.

In addition, a projection of the positive electrode active material layer on the current collector did not overlap a projection of the resistance layer on the current collector at all, as shown in FIG. 5.

The composition of the resistance layer in the positive electrode sheet, the area ratio S of the resistance layer relative to the coating region of the current collector, the film resistance value R1 of the part provided with the resistance layer, the film resistance value R2 of the part without the resistance layer, a corresponding value of R1/R2, a value of the polarization parameter P and the number of cycles and 60 s pulse discharge power of the battery measured by the performance test method described above are shown in Table 2 below.

TABLE 2

| | | Example 7 | Example 8 | Example 9 | Example 10 | Comparative Example 3 | Comparative Example 4 |
|---|---|---|---|---|---|---|---|
| Resistance layer Composition | Binder mass content | 25% | 15% | 10% | 50% | 70% | 75% |
| | Conductive agent mass content | 5% | 15% | 20% | 10% | 0% | 10% |
| | Positive electrode active material Mass content | 70% | 70% | 70% | 40% | 30% | 15% |
| R1 (Ω) | | 0.92 | 0.48 | 0.41 | 1.23 | 11.32 | 13.55 |
| R2 (Ω) | | 0.35 | 0.35 | 0.35 | 0.35 | 0.35 | 0.35 |
| R1/R2 | | 2.63 | 1.37 | 1.17 | 14.94 | 32.34 | 38.71 |
| S | | 0.30 | 0.30 | 0.30 | 0.30 | 0.30 | 0.30 |
| P | | 6.1 | 3.2 | 2.7 | 34.9 | 75.5 | 90.0 |
| Number of cycles (times) | | 2402 | 2598 | 2501 | 1685 | 942 | 1049 |
| 60 s pulse discharge power (W) | | 1371.0 | 1427.5 | 1427.5 | 1010.8 | 734.2 | 775.8 |

As can be seen from the results shown in Table 2, in the structure shown in FIG. 5, compared with the control example in which the resistance layer is not provided, by providing the resistance layer on the current collector, and making the projection of the positive electrode active material layer on the current collector and the projection of the resistance layer on the current collector not overlap at all, the cycle performance of the secondary batteries of Examples 7 to 10 is significantly improved, and the number of cycles at which the discharge capacity remains above 80% of the initial capacity is significantly increased from 835 times to more than 1600 times, so that the service lives of the batteries are greatly prolonged. In addition, the resistance layer includes a certain mass content of positive electrode active material, which can increase the polarization of the positive electrode sheet while improving the energy density of the battery, thereby ensuring that the battery has good power performance. The 60 s pulse discharge power of the battery is maintained at 1000 W or more.

In Examples 7 to 10, by applying the binder with the higher mass content, a higher resistance value can be achieved in the resistance layer, so that the film resistance value (R1) of the positive electrode sheet in the part where the resistance layer is provided is greater than the film resistance value (R2=0.35Ω) of the part where the resistance layer is not provided, which produces appropriate lithium ion polarization in the positive electrode sheet. Therefore, in the part of the positive electrode sheet where the resistance layer is provided, the deintercalation speed of active lithium ions is slowed down, so that part of the lithium remains in this part. During the subsequent cycle of the battery, with the gradual aging of the battery, the active lithium retained in the region is gradually released, and the battery capacity shows a trend of increasing first and then gradually decreasing, thereby increasing the service life of the battery.

In addition, by adjusting the composition of the resistance layer, specifically by adjusting the respective mass contents of the binder, the conductive agent and the positive electrode active material in the resistance layer to adjust the resistance value of the resistance layer, it is possible to adjust the positive electrode active material layer above the resistance layer. Therefore, the amount of active lithium retained in the positive electrode sheet can be adjusted, and the service life of the battery can be adjusted according to needs.

In Comparative Examples 3 and 4, in the case where the area ratio of the resistance layer relative to the coating region of the current collector is also 0.30, a ratio of the film resistance value R1 of the part provided with the resistance layer relative to the film resistance value R2 of the part not provided with the resistance layer is relatively large, which causes the polarization parameter of the positive electrode sheet to be too large, which exceeds the range of 0.4-65.0. Although compared with the control example not provided with the resistance layer, the number of cycles in which the discharge capacity is kept above 80% of the initial capacity is increased, but the resistance of the resistance layer is too large, which affects the power performance of the battery to a certain extent, and the 60 s pulse discharge power of the battery is less than 800 W.

Therefore, compared with Comparative Examples 3 and 4, in Examples 7-10, by adjusting the composition of the resistance layer to make the polarization parameter P of the positive electrode sheet in the range of 0.4-65.0, an appropriate amount of active lithium is retained for the positive electrode sheet while the power performance of the battery is ensured, thereby increasing the service life of the battery.

Examples 11-19

The positive electrode sheet and the battery were prepared according to the general method described above. In the resistance layer, based on the total weight of the resistance layer, the mass content of the conductive agent is 10%, the mass content of the binder is 30%, and the mass content of the positive electrode active material is 60%. The thickness of the aluminum foil as the current collector was 12 μm. The thickness of the resistance layer provided on the current collector was 10 μm. The Dv50 of the positive electrode active material in the positive electrode active material layer was 4 μm. The thickness of the positive electrode sheet was 180 μm, and the compaction density was 3.4 g/cm³.

In Examples 11-19, the film resistance value R1 of the part provided with the resistance layer and the film resistance value R2 of the part not provided with the resistance layer were 1.16Ω and 0.35Ω respectively. Correspondingly, R1/R2=3.31.

In addition, a projection of a part of the positive electrode active material layer on the current collector overlapped a projection of the resistance layer on the current collector, as shown in FIG. 4.

The area ratio S of the resistance layer relative to the coating region of the current collector, the corresponding polarization parameter P value, and the number of cycles and 60 s pulse discharge power of the battery measured by the performance test method described above are shown in Table 3 below.

TABLE 3

|  | S | P | Number of cycles | 60 s pulse discharge power (W) |
|---|---|---|---|---|
| Example 11 | 0.15 | 18.8 | 1230 | 1542.3 |
| Example 12 | 0.20 | 13.2 | 1932 | 1477.4 |
| Example 13 | 0.30 | 7.7 | 2298 | 1427.3 |
| Example 14 | 0.40 | 5.0 | 2509 | 1381.1 |
| Example 15 | 0.50 | 3.3 | 2388 | 1298.6 |
| Example 16 | 0.60 | 2.2 | 2176 | 1212.9 |
| Example 17 | 0.70 | 1.4 | 1870 | 1077.0 |
| Example 18 | 0.80 | 0.8 | 1635 | 1031.5 |
| Example 19 | 0.85 | 0.4 | 1100 | 987.5 |

As can be seen from the results shown in Table 3, compared with the control example in which the resistance layer is not provided, by providing the resistance layer on the current collector, and making the projection of a part of the positive electrode active material layer on the current collector overlapping the projection of the resistance layer on the current collector, the cycle performance of the secondary batteries of Examples 11-19 is significantly improved, and the number of cycles at which the discharge capacity remains above 80% of the initial capacity is significantly increased from 835 times to more than 1100 times, so that the service lives of the batteries are greatly prolonged. In addition, the resistance layer includes a certain mass content of positive electrode active material, which can increase the polarization of the positive electrode sheet while improving the energy density of the battery, thereby ensuring that the battery has good power performance. The 60 s pulse discharge power of the battery is maintained at 950 W or more.

In Examples 11-19, the film resistance value (R1) of the positive electrode sheet in the part provided with the resistance layer is greater than the film resistance value (R2=0.35Ω) of the part not provided with the resistance layer. Specifically, the ratio of the film resistance value R1 of the part where the resistance layer is provided to the film resistance value R2 of the part where the resistance layer is not provided is 3.31. As a result, appropriate lithium ion polarization is generated in the positive electrode sheet. Therefore, in the part of the positive electrode sheet where the resistance layer is provided, the deintercalation speed of active lithium ions is slowed down, so that part of the lithium remains in this part. During the subsequent cycle of the battery, with the gradual aging of the battery, the active lithium retained in the region is gradually released, and the battery capacity shows a trend of increasing first and then gradually decreasing, thereby increasing the service life of the battery.

Besides, by adjusting the area ratio S of the resistance layer relative to the coating region of the current collector to adjust the polarization parameter P of the positive electrode sheet in the range of 0.4-65.0, an appropriate amount of active lithium may be retained for the positive electrode sheet, thereby increasing the service life of the battery and ensuring the power performance of the battery. Adjusting the area ratio S of the resistance layer relative to the coating region of the current collector may also play a role in adjusting the amount of lithium retained in the positive electrode active material layer above the resistance layer, thereby adjusting the amount of active lithium retained in the positive electrode sheet, and the service life of the battery can be adjusted according to needs.

To sum up, by adjusting the composition of the resistance layer provided on the current collector of the positive electrode sheet, the film resistance of the positive electrode sheet in the part provided with the resistance layer is adjusted to be appropriately larger than the film resistance of the part without the resistance layer, and/or by adjusting the area ratio of the resistance layer relative to the coating region of the current collector, appropriate lithium ion polarization can be generated in the positive electrode sheet, thereby achieving the polarization parameter P in the range of 0.4-65.0. Compared with Comparative Examples 1-4 with the polarization parameter exceeding the range of 0.4-65.0, the cycle performance of the battery in Examples 1-19 is significantly improved, and the number of cycles with the discharge capacity maintained at more than 80% of the initial capacity reaches more than 1100 cycles, which greatly prolongs the service life of the battery, and also ensures that the battery maintains good power performance, and the 60 s pulse discharge power of the battery remains at 950 W or more.

Examples 20-23

The positive electrode sheet and the battery were prepared according to the general method described above. In the resistance layer, based on the total weight of the resistance layer, the mass content of the conductive agent is 5%, the mass content of the binder is 25%, and the mass content of the positive electrode active material is 70%. The thickness of the aluminum foil as the current collector was 12 μm. The thickness of the resistance layer provided on the current collector was 10 μm. The Dv50 of the positive electrode active material in the positive electrode active material layer was 4 μm.

In Examples 20-23, the film resistance value R1 of the part provided with the resistance layer and the film resistance value R2 of the part not provided with the resistance layer were 0.92Ω and 0.35Ω respectively. In addition, the area ratio of the resistance layer relative to the coating region of the current collector was 0.30. Accordingly, the value of the polarization parameter P was 6.1.

In addition, a projection of the positive electrode active material layer on the current collector did not overlap a projection of the resistance layer on the current collector at all, as shown in FIG. 5.

The compaction density and thickness of the positive electrode sheet, as well as the number of cycles and the 60 s pulse discharge power of the battery measured by the performance test method described above are shown in Table 4 below.

TABLE 4

| | Compaction density of positive electrode sheet (g/cm³) | Thickness of electrode sheet (μm) | Number of cycles | 60 s pulse discharge power (W) |
|---|---|---|---|---|
| Example 20 | 2.0 | 197 | 1850 | 1050.5 |
| Example 21 | 2.5 | 160 | 1960 | 1231.8 |
| Example 22 | 3.4 | 120 | 2059 | 1358.8 |
| Example 23 | 4.0 | 105 | 2130 | 1467.5 |

As shown in Table 4, compared with Example 20, in Examples 21-23, when the compaction density is within the range of 2.3-4.0 g/cm³, the following additional effects can also be achieved: the thickness of the electrode sheet is reduced, the cycle life of the battery is increased, and the active lithium shuttle path is reduced, thereby further improving the power performance of the battery while increasing the cycle life of the battery, the number of cycles in which the discharge capacity is maintained at more than 80% of the initial capacity reaches 1950 times or more, and the 60 s pulse discharge power is maintained at 1200 W or more.

Examples 24-34

The positive electrode sheet and the battery were prepared according to the general method described above. In the resistance layer, based on the total weight of the resistance layer, the mass content of the conductive agent is 10%, the mass content of the binder is 80%, and the mass content of the positive electrode active material is 10%. The thickness of the aluminum foil as the current collector was 12 μm. The thickness of the resistance layer provided on the current collector was 10 μm. The Dv50 of the positive electrode active material in the positive electrode active material layer was 4 μm. The thickness of the positive electrode sheet was 180 μm, and the compaction density was 3.4 g/cm³.

In Examples 24-34, the film resistance value R1 of the part provided with the resistance layer and the film resistance value R2 of the part not provided with the resistance layer were 2.43Ω and 0.35Ω respectively. In addition, the area ratio of the resistance layer relative to the coating region of the current collector was 0.55. Accordingly, the value of the polarization parameter P was 5.7.

Dv50 of the positive electrode active material used in the positive electrode active material layer, as well as the number of cycles and 60 s pulse discharge power of the battery measured by the performance test method described above are shown in Table 5 below.

TABLE 5

| | Positive electrode active material Dv50 (μm) | Number of cycles | 60 s pulse discharge power (W) |
|---|---|---|---|
| Example 24 | 3 | 1845 | 1540.2 |
| Example 25 | 4 | 1971 | 1491.4 |
| Example 26 | 5 | 2110 | 1474.5 |
| Example 27 | 6 | 2211 | 1436.8 |
| Example 28 | 7 | 2310 | 1407.2 |
| Example 29 | 8 | 2236 | 1389.9 |
| Example 30 | 10 | 2154 | 1314.3 |
| Example 31 | 12 | 2083 | 1306.3 |
| Example 32 | 13 | 1959 | 1244.0 |
| Example 33 | 14 | 1866 | 1230.5 |
| Example 34 | 15 | 1740 | 1160.7 |

The results shown in Table 5 show that in Examples 24-34, by using the positive electrode active material with the larger particle size, polarization can be generated inside the particles of the positive electrode active material, the polarizability of the positive electrode sheet is further improved, and thus the cycle performance of the battery can be additionally improved. Compared with Examples 24, 25, and 32-34, in Examples 26-31, Dv50 of the positive electrode active material is in the range of 5-12 μm, the interior of the particles is polarized, and the particles are more fully dispersed, so that the power performance of the battery is fully ensured while the cycle life of the battery is further increased, the number of cycles in which the discharge capacity is maintained at more than 80% of the initial capacity reaches more than 2000 times, and 60 s pulse discharge power is maintained at 1300 W or more.

To sum up, by adjusting the composition of the resistance layer provided on the current collector of the positive electrode sheet, the film resistance of the positive electrode sheet in the part provided with the resistance layer is adjusted to be appropriately larger than the film resistance of the part without the resistance layer, and/or by adjusting the area ratio of the resistance layer relative to the coating region of the current collector, appropriate lithium ion polarization can be generated in the positive electrode sheet, thereby achieving the polarization parameter P in the range of 0.4-65.0, and giving the positive electrode sheet appropriate polarizability, and thus capacity decay of the battery is lowered, the number of cycles in which the discharge capacity is maintained at more than 80% of the initial capacity reaches more than 1100 times, the service life of the battery is greatly prolonged, good power performance of the battery is ensured at the same time, and 60 s pulse discharge power of the battery is kept at 950 W or more.

INDUSTRIAL APPLICABILITY

When applied to a secondary battery, a positive electrode sheet provided with a resistance layer on a current collector of the present application has the effect of increasing lithium ion polarization of the electrode sheet, and in the cycle process, with the gradual aging and elimination of the battery polarization, the battery capacity shows a trend of rising first and then gradually decaying, which increases the cycle life of the battery while ensuring the power performance of the battery. Thus, the present application is suitable for industrial applications.

The invention claimed is:

1. A positive electrode sheet for a secondary battery, comprising:
   a current collector comprising a coating region and a non-coating region other than the coating region;
   a resistance layer disposed on the current collector and comprising a conductive agent, a first binder, and a first positive electrode active material; and
   a positive electrode active material layer comprising a second positive electrode active material, a conductive agent, and a second binder;

wherein:
    a resistance of the resistance layer is greater than a resistance of the positive electrode active material layer;
    in a cross section of the positive electrode sheet, a projection of at least a part of the positive electrode active material layer on the current collector and a projection of the resistance layer on the current collector do not overlap, and
    a polarization parameter P of the positive electrode sheet is in a range of 0.4-65.0, and the polarization parameter $P=((1-S)/S) \cdot (R1/R2)$, wherein S is an area ratio of the resistance layer relative to the coating region of the current collector, R1 is a film resistance value of the positive electrode sheet in a part where the resistance layer is provided, and R2 is a film resistance value of the positive electrode sheet in a part of the coating region where the resistance layer is not provided.

2. The positive electrode sheet according to claim 1, wherein P is in a range of 0.5-36.0.

3. The positive electrode sheet according to claim 1, wherein P is in a range of 1.5-8.0.

4. The positive electrode sheet according to claim 1, wherein S is in a range of 0.15-0.85.

5. The positive electrode sheet according to claim 1, wherein S is in a range of 0.40-0.60.

6. The positive electrode sheet according to claim 1, wherein a projection of a part of the positive electrode active material layer on the current collector overlaps the projection of the resistance layer on the current collector.

7. The positive electrode sheet according to claim 1, wherein a projection of the positive electrode active material layer on the current collector and the projection of the resistance layer on the current collector do not overlap at all.

8. The positive electrode sheet according to claim 1, wherein in the resistance layer:
    a mass content of the first binder is 10.0-85.0 wt % based on a total weight of the resistance layer;
    a mass content of the first positive electrode active material is 10.0-70.0 wt % based on the total weight of the resistance layer; and/or
    a mass content of the conductive agent is 5.0-20.0 wt % based on the total weight of the resistance layer.

9. The positive electrode sheet according to claim 1, wherein R1/R2 is in a range of 1.15-26.00.

10. The positive electrode sheet according to claim 9, wherein:
    R1 is in a range of 0.3-8.0Ω; and/or
    R2 is in a range of 0.3-4.0Ω.

11. The positive electrode sheet according to claim 1, wherein: the first positive electrode active material and the second positive electrode active material each comprise one or more selected from lithium cobalt oxide, lithium manganate, lithium nickel cobalt manganese oxide, lithium nickel cobalt aluminium oxide, lithium iron phosphate, or lithium manganese nickel oxide; the conductive agent comprises one or more selected from graphite, carbon black, acetylene black, graphene or carbon nanotubes; and the first binder and the second binder each comprise one or more selected from polyvinylidene fluoride, polyacrylic acid, polytetrafluoroethylene, or polyimide.

12. The positive electrode sheet according to claim 1, wherein: the first positive electrode active material and the second positive electrode active material each comprise one or more selected from layered transition metal oxide, polyanionic compound, Prussian blue compound, sulfide, nitride, carbide, or titanate; the conductive agent comprises one or more selected from graphite, carbon black, acetylene black, graphene, or carbon nanotubes; and the first binder and the second binder each comprise one or more selected from polyvinylidene fluoride, polyacrylic acid, polytetrafluoroethylene or polyimide.

13. The positive electrode sheet according to claim 1, wherein a compaction density of the positive electrode sheet is 2.0-4.0 g/cm³.

14. The positive electrode sheet according to claim 1, wherein a compaction density of the positive electrode sheet is 2.3-4.0 g/cm³.

15. The positive electrode sheet according to claim 1, wherein:
    a thickness of the current collector is 8-14 μm;
    a thickness of the positive electrode sheet is 100-200 μm; and/or
    a thickness of the resistance layer is 1-30 μm.

16. The positive electrode sheet according to claim 1, wherein $D_v50$ of at least one of the first positive electrode active material or the second positive electrode active material is 1-20 μm.

17. A secondary battery, comprising:
    a positive electrode comprising a positive electrode sheet, the positive electrode sheet comprising:
        a current collector comprising a coating region and a non-coating region other than the coating region;
        a resistance layer disposed on the current collector and comprising a conductive agent, a first binder, and a first positive electrode active material; and
        a positive electrode active material layer comprising a second positive electrode active material, a conductive agent, and a second binder;
    wherein:
        a resistance of the resistance layer is greater than a resistance of the positive electrode active material layer;
        in a cross section of the positive electrode sheet, a projection of at least a part of the positive electrode active material layer on the current collector and a projection of the resistance layer on the current collector do not overlap, and
        a polarization parameter P of the positive electrode sheet is in a range of 0.4-65.0, and the polarization parameter $P=((1-S)/S) \cdot (R1/R2)$, wherein S is an area ratio of the resistance layer relative to the coating region of the current collector, R1 is a film resistance value of the positive electrode sheet in a part where the resistance layer is provided, and R2 is a film resistance value of the positive electrode sheet in a part of the coating region where the resistance layer is not provided.

18. An electrical apparatus, comprising at least one of the secondary battery according to claim 17.

19. A battery module, comprising:
    a secondary battery comprising a positive electrode, the positive electrode comprising a positive electrode sheet, and the positive electrode sheet comprising:
        a current collector comprising a coating region and a non-coating region other than the coating region;
        a resistance layer disposed on the current collector and comprising a conductive agent, a first binder, and a first positive electrode active material; and
        a positive electrode active material layer comprising a second positive electrode active material, a conductive agent, and a second binder;

wherein:
- a resistance of the resistance layer is greater than a resistance of the positive electrode active material layer;
- in a cross section of the positive electrode sheet, a projection of at least a part of the positive electrode active material layer on the current collector and a projection of the resistance layer on the current collector do not overlap, and
- a polarization parameter P of the positive electrode sheet is in a range of 0.4-65.0, and the polarization parameter $P=((1-S)/S) \cdot (R1/R2)$, wherein S is an area ratio of the resistance layer relative to the coating region of the current collector, R1 is a film resistance value of the positive electrode sheet in a part where the resistance layer is provided, and R2 is a film resistance value of the positive electrode sheet in a part of the coating region where the resistance layer is not provided.

20. A battery pack, comprising the battery module according to claim 19.

\* \* \* \* \*